United States Patent [19]

Tokuno

[11] 4,044,901
[45] Aug. 30, 1977

[54] GOODS DISCHARGING APPARATUS

[75] Inventor: Masateru Tokuno, Nishinomiya, Japan

[73] Assignee: Rengo Co., Ltd., Osaka, Japan

[21] Appl. No.: 573,253

[22] Filed: Apr. 30, 1975

[30] Foreign Application Priority Data

Dec. 18, 1974   Japan ................ 49-145915

[51] Int. Cl.² ............................................ B65G 65/02
[52] U.S. Cl. .................................. 214/89; 214/41 R;
198/470; 198/476; 198/489
[58] Field of Search .................. 214/26, 89, 16.4 A,
214/16.1 CB, 1 QG, 25, 6 DK, 512, 38 R, 41;
198/219, 34, 470, 610, 489, 476; 254/10 C, 124

[56] References Cited

U.S. PATENT DOCUMENTS

| 2,024,949 | 12/1935 | Schefe | 214/26 X |
|---|---|---|---|
| 3,055,514 | 9/1962 | Dale et al. | 214/514 X |
| 3,195,739 | 7/1965 | Hein et al. | 214/6 DK |
| 3,221,870 | 12/1965 | Pagay | 198/219 |
| 3,502,234 | 3/1970 | Cook | 214/26 |
| 3,606,310 | 9/1971 | Larson | 214/6 DK |
| 3,674,159 | 7/1972 | Lemelson | 214/16.4 A |
| 3,786,911 | 1/1974 | Milazzo | 198/219 |

Primary Examiner—Albert J. Makay
Attorney, Agent, or Firm—Birch, Stewart, Kolasch and Birch

[57] ABSTRACT

The present invention relates to an apparatus for discharging goods such as stacked-up boards of corrugated board, cardboard, pasteboard or plywood, or pallets loaded with such goods, from a conveyor means such that said goods or pallet may be immediately transferred onto a pallet or a transporter such as a forklift which is waiting at a location close to the discharge end of said conveyor means. The discharging apparatus essentially comprises a platform which is movable up and down, means for lifting said movable platform up and down, a goods support secured to said movable platform such that said support can extend out from said platform, means mounted on said movable platform for moving said goods support forward or backward, and a conveyor means arranged such that said goods support can be raised up from the goods carrying surface of the conveyor means with an upward or downward movement of said movable platform and that said goods support can also extend out from said conveyor means at the same time as it extends out from said movable platform.

8 Claims, No Drawings

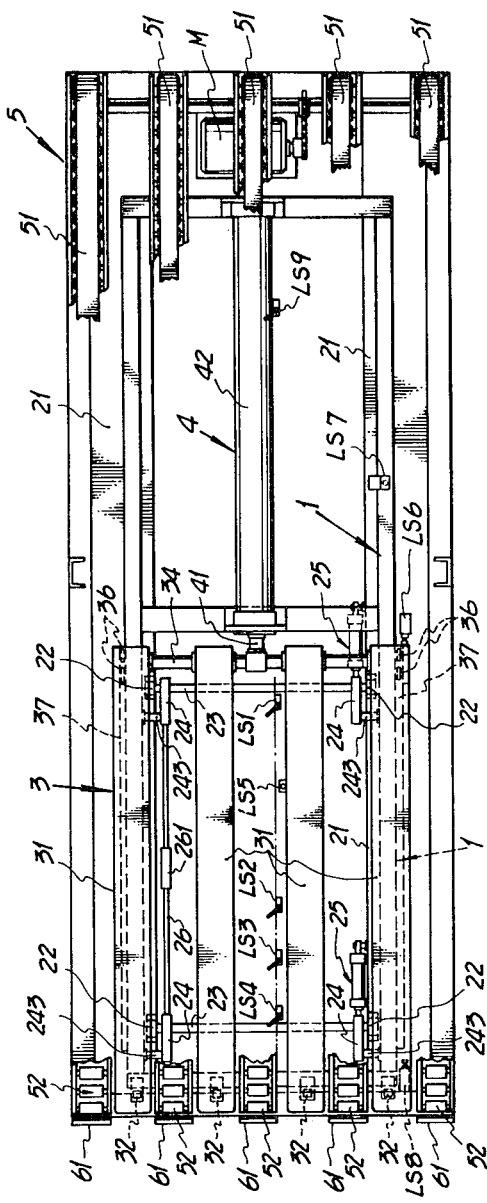
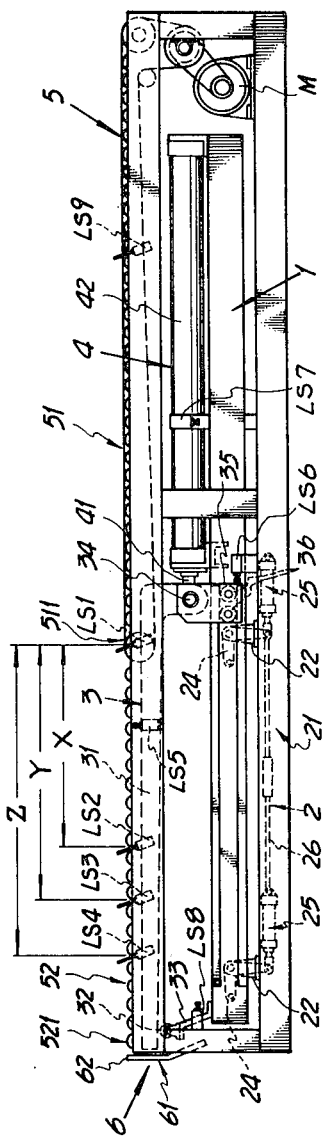

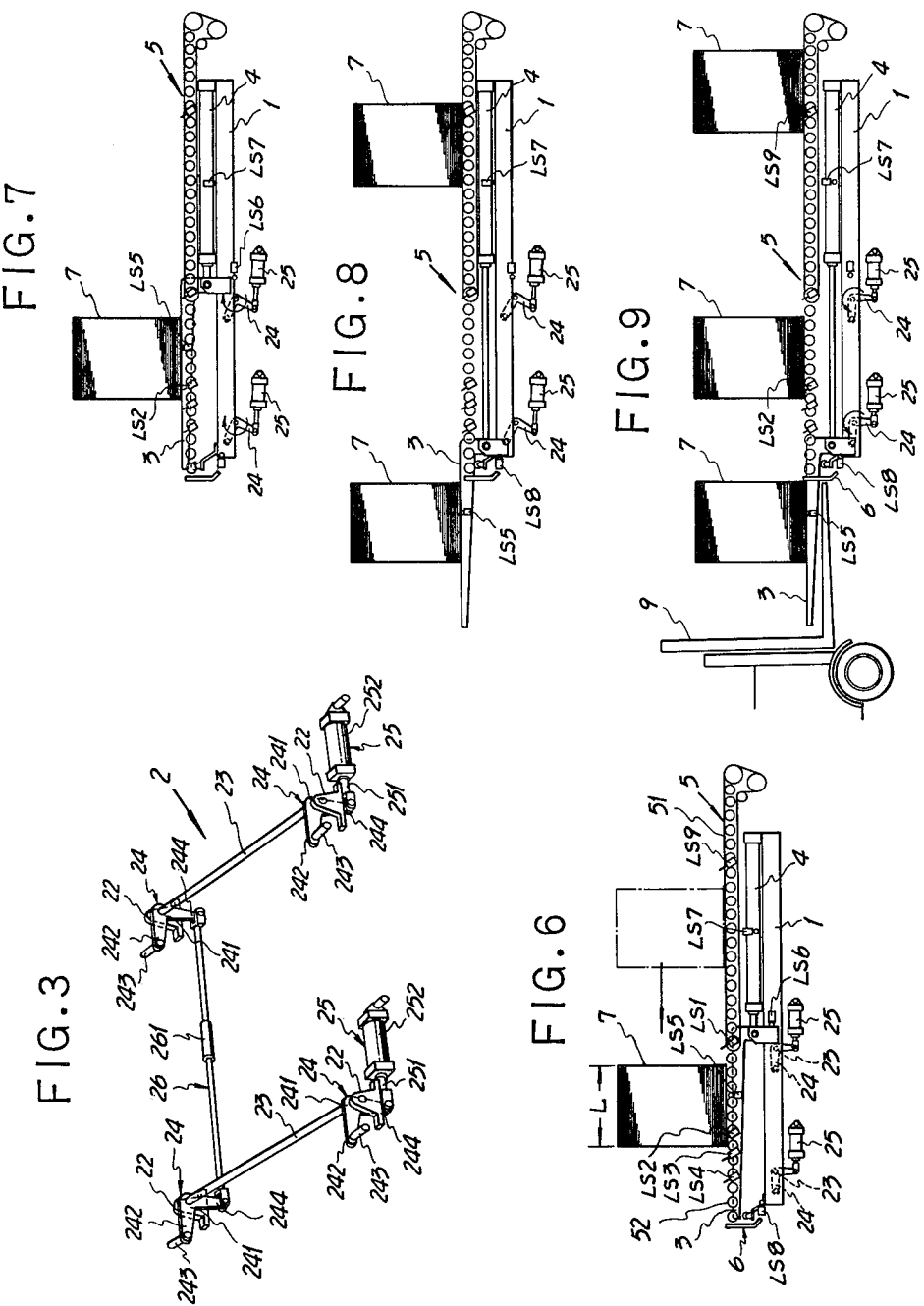

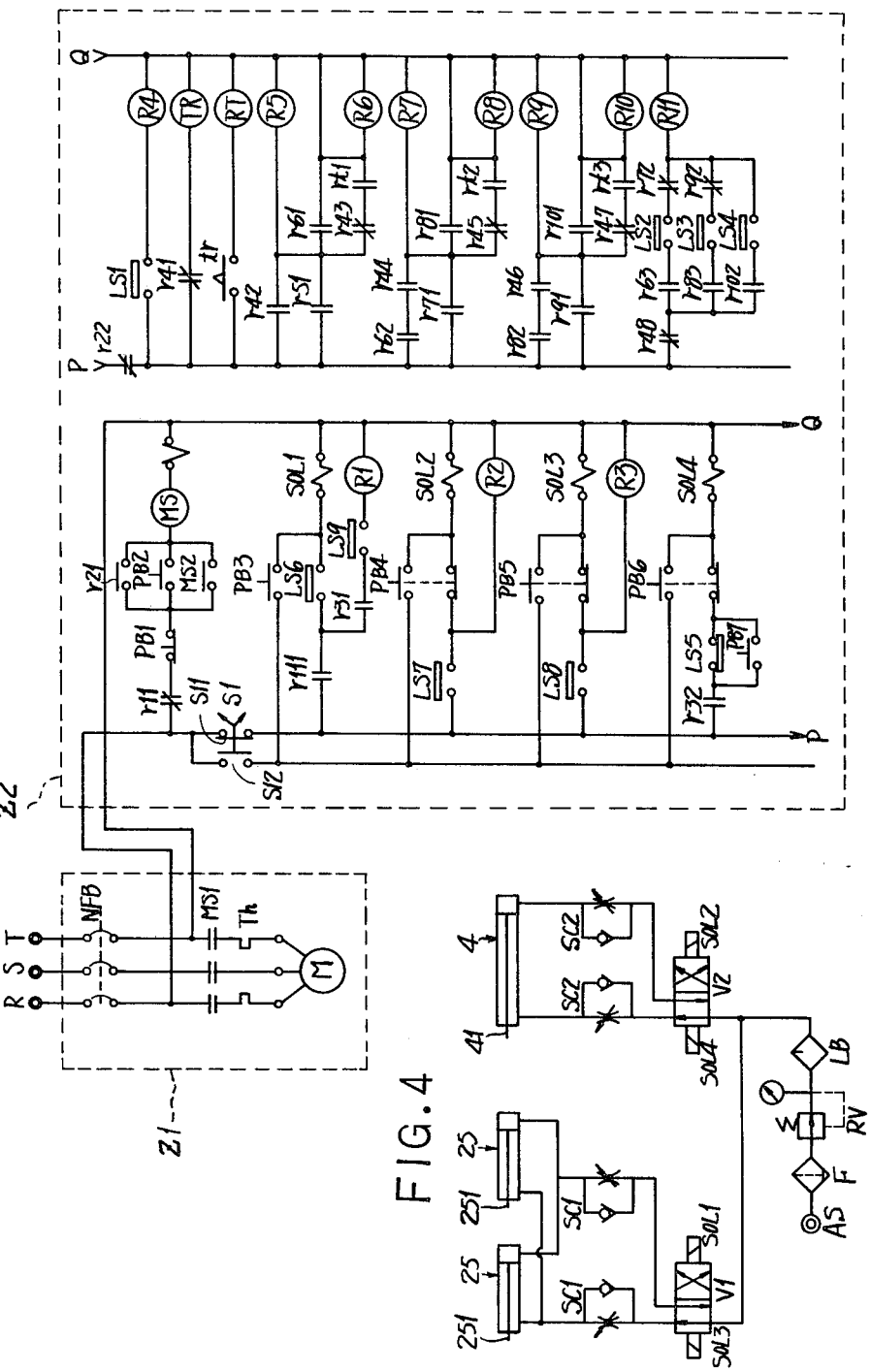

GOODS DISCHARGING APPARATUS

BACKGROUND AND SUMMARY OF THE INVENTION

The present invention relates to an apparatus for discharging goods such as piled-up boards of corrugated board, cardboard, pasteboard or plywood, or pallets loaded with such goods, from a conveyor device such that said goods or pallets can be immediately transferred from said conveyor device onto a pallet or a transporter such as a forklift which is waiting at a location close to the discharge end of said conveyor.

Corrugated board, cardboards, pasteboards, plywoods or the like, which are manufactured sheet by sheet or in a set of several sheets and finished to a suitable size are usually stacked up very high for the purpose of storage, and when it is desired, said pile of corrugated boards, etc., is carried by a suitable conveyor and then transferred to a pallet or a transporter such as a forklift to be thereby transported to another suitable place for storage. When transferring such goods from a conveyor to a pallet or a transporter, it is highly desirable that the goods is transferred quickly so that it will not break down during transfer.

An object of the present invention is to provide an apparatus for discharging goods such as piles of sheets of corrgugated board, cardboard, pasteboard, plywood or the like, or pallets loaded with such goods, from a conveyor to a pallet or a transporter such as a forklift waiting at a location close to the discharge end of said conveyor such that said goods can be transferred to said waiting pallet or transporter quickly, thereby substantially avoiding breakdown.

Another object of the present invention is to provide the above type of discharging apparatus which is capable of simultaneously discharging one or more lots of goods in accordance with the length of one lot of goods in the direction of advancement of the conveyor.

Other objects, features and advantages of the invention will be readily apparent from the following description of certain preferred embodiments thereof, taken in conjunction with the accompanying drawings, wherein:

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 is a plane view, with parts cut away, of an apparatus according to the present invention;

FIG. 2 is a side elevation thereof;

FIG. 3 is a schematic drawing showing the means for lifting the movable platform up and down;

FIG. 4 is an air flow diagram for the apparatus of the present invention;

FIG. 5 is an electrical diagram for the apparatus of the present invention; and

FIGS. 6 to 9 show the goods discharging steps.

Referring generally to the drawings, reference numeral 1 designates a vertically movable platform, and 2 a means for lifting said movable platform 1 up and down. As apparent from FIGS. 1, 2 and 3, said means 2 comprises a pair of shafts 23 pivotally secured to a base frame 21 through bearings 22, four L-shaped arms 24 secured to the respective ends of said shafts 23, two air cylinders 25 each of which is adapted to rotate the arm 24 at one end of the associated one of said shafts 23, and a connecting rod 26 connecting the arms 24 at the other ends of said respective shafts 23 to enable said arms to cooperate with each other. Each said arms 24 is secured at its middle part 241 to the corresponding shaft 23 and is also pivoted at its upper end 242 to the movable platform 1 by means of a pin 243. Each air cylinder 25 has its piston rod 251 pivotaly secured to the lower end 244 of the corresponding arm 24, with the cylinder tube 252 being rotatably supported by the base 21. The connecting road 26 is desirably provided with a turnbuckle 261 for allowing adjustment of the length of the rod. Both ends of said rod 26 are pivoted to the lower ends 244 of the arms 24 at the other ends of the shafts 23. When the piston rods 251 are retracted in the respective cylinder tubes 252, the platform 1 stays at its lowered position, but when the piston rods 251 project out from the respective cylinder tubes 252, the arms 24 are turned about the axes of the respective shafts 23 to raise up the platform 1 to its elevated position.

Reference numeral 3 indicates a goods support which consists of four horizontal supporting members 31 arranged parallel to each other and suitably spaced apart from each other. At the time when one lot of goods is placed on the supporting members 31 and the ends thereof are flexed downwardly, the supporting rollers 32 designed for supporting said respective supporting members 31 are positioned just beneath the ends of said respective supporting members 31. Each of said supporting rollers 32 is rotatably supported by a frame 33 which is erected at the end of the platform 1. The rear ends of said respective supporting members 31 are secured to a shaft 34 disposed vertical to the said members 31. At the rear ends of the supporting members 31 positioned on both sides of the supporting member assembly is secured a downwardly directed frame 35 to which guide rolls 36 are rotatably mounted. Said guide rolls 36 are carried on the rails 37 laid alongside the platform 1 so as to facilitate smooth forward or reverse movement of the supporting members 31.

Reference numeral 4 denotes an air cylinder having its piston rod 41 connected to the shaft 34 of the goods support 3 while the cylinder tube 42 thereof is secured on the platform 1. When the piston rod 41 of said air cylinder 4 remains retracted in the tube 42, the support 3 stays at its recessed position, that is, on the movable platform 1, but when said piston rod 41 projects out from the cylinder tube 42, said goods support 3 sticks out from the platform 1. Numeral 5 designates a conveyor means which comprises a parallel array of belt conveyors 51 disposed above the movable platform 1 and supported by the base frame 21 and also a parallel array of roller conveyors 52. Said belt conveyors 51 are driven by an electric motor M. The roller conveyors 52 extend forwardly from the discharge end 511 of the belt conveyors 51. Both of conveyors 51 and 52 are arranged such that the goods support 3 may further run forwardly from the discharge end 511 of the belt conveyors 51 toward the discharge end 521 of the roller conveyors 52, so that the support 3 may rise up from the goods carrying surface of the conveyors with an upward or downward movement of the movable platform 1, and that said support 3 may also simultaneously extend out from the conveyor assembly when it extends out from the platform 1. Numeral 6 indicates checking means comprising a plate-like member 61 provided vertically at the discharge end 521 of the roller conveyors 52 so as not to obstruct forward or rearward movement of the support 3. The claw portion 62 of said plate-like member 61 is positioned lower than the upper surfaces of the support 3 when the support 3 is in its raised position but higher than the upper surface of the support 3 when said support is disposed at its lowered position.

An air flow diagram of the above-described goods discharging apparatus is shown in FIG. 4. In the figure, AS designates a compressed air source, F a filter, RV a flow regulating valve provided with a pressure gauge, LB a lubricator, V1 and V2 tow-position double solenoid valves, SOL1 and SOL3 solenoids of said valve V1, SOL2 and SOL4 solenoids of said valve V2, and SC1 and SC2 speed controllers. Numeral 25 indicates air cylinders for driving the movable platform 1, and 4 an air cylinder for driving the support 3. In the condition shown in FIG. 4, the solenoids SOL3 and SOL4 of the respective valves V1 and V2 are either magnetized or demagnetized after having been once magnetized, while the valves V1 and V2 are acting to force back the piston rods 251 and 41 of said respective air cylinders 25 and 4. The piston rods 251 and 41 project out when said solenoids SOL3 and SOL4 are demagnetized and the solenoids SOL1 and SOL2 magnetized.

FIG. 5 shows and electrical diagram of the described goods discharging apparatus of the present invention. In the figure, R, S and T indicate the terminals for three-phase AC power connections, and ZONE Z1 shows the power circuit while ZONE Z2 shows the operating circuit. In the ZONE Z1, NFB designates no-fuse breakers, MS1 normally opened contacts of the magnetic contactor MS in the ZONE Z2, and Th thermal relays for protection of the electric motor M for the belt conveyors 51. The normally opened contacts are hereinafter referred to as A-contacts. In ZONE Z2, S1 designates an automatic-manual operation changeover switch whereby either the contact S11 for automatic operation or the contact S12 for manual operation can be maintained at the closed position by turning the switch handle. MS2 denotes the A-contacts for the contactor MS. PH2 is a motor starting switch, and PB1 a motor stopping switch. PB3, PB4, PB5, PB6 and PB7 are switches for manually operating the solenoids SOL1, SOL2, SOL3 and SOL4, respectively. Said switches PB3 to PB7 are the momentary push button switches arranged such that only when their switch knobs are pushed down, the A-contacts are closed while the normally closed contacts are opened. The normally closed contacts are hereinafter referred to as B-contacts. LS1 to LS 9 are limit switches. As apparent from FIG. 2, the switch LS1 is positioned at the discharge end of the belt conveyor assembly 51 such that said switch is closed when the goods passes the discharge end of said conveyor assembly 51. Switches LS2, LS3 an LS4 are arranged successively on the roller conveyor assembly 52 such that they are closed when the goods passes on said conveyor assembly 52. It will be also noted that the switch LS2 is located at a position spaced a distance X from the switch LS1, and the switch LS3 is located at a position spaced a distance Y from the switch LS1, while the switch LS4 is placed at a position spaced a distance Z from the switch LS1 (here, $X < Y < Z$). Switch LS5 is disposed on the support 3 so that it is opened by the goods when the latter is placed on the support 3, and switch LS6 is disposed on the base 21 such that it is closed by the support 3 when the piston rod 41 of the air cylinder 4 has perfectly retracted into the cylinder tube 42. Switch LS7 is also disposed on the base 21 so that it is closed by the movable platform 1 when the piston rod 251 of the air cylinder 25 has perfectly projected out from the cylinder tube 252, and switch LS8 is also positioned on the base 21 such that it is closed by the support 3 when the piston rod 41 of the air cylinder 4 has perfectly moved out of the cylinder tube 42, while switch LS9 is adjustably disposed on the conveyor assembly 51 so that it is closed by the goods when said goods passes on said conveyor assembly 51. In ZONE Z2, R1 to R11 designate relay coils, and r21, r31, r32, r42, r44, r46, r51, r61, r62, r63, r71, r81, r82, r83, r91, r101, r102 and r111 are A-contacts of said relays R2 to R11, respectively, while r11, r22, r41, r43, r45, r47, r48, r72 and r92 are B-contacts of said relays R1, R2, R4, R7 and R9. TR is a timer relay, and tr is A-contact of said relay TR. This A-contact is closed upon lapse of a certain set period of time after energization of the relay TR. RT is a relay, and rt1, rt2 and rt3 are A-contacts of said relay RT.

Now the operation of the present apparatus as used for discharging piles of cardboards 7 will be described. First the contact S11 (for automatic operation) of the switch S1 in the operating circuit is closed while turning on the switch PB2 to start operation of the motor M to actuate the belt conveyors 51, whereby one lot of goods 7 (a pile of cardboards in the instant embodiment) is transferred from a suitable means (not shown) onto the belt conveyors 51 to carry said lot toward the discharge end 511. Upon reaching the discharge end 511 of the belt conveyors 51, said goods 7 closes the limit switch LS1 and is pushed out from the belt conveyors 51 onto the roller conveyors 52 (see FIG. 6). In case the length L of this lot of goods 7 in the advancing direction is greater than the distance X between the limit switches LS1 and LS2, the limit switch LS2 of the roller conveyors 52 will have already been closed by the goods 7 when said goods is discharged from the belt conveyors 51 and the limit switch LS1 is opened. Accordingly, the relay R11 is excited. When the relay R11 (see FIG. 5) is excited by one-time closing of the switch LS1 and closure of the switch LS2, the solenoid SOL1 is energized if the limit switch LS6 stays closed at such time. As the solenoid SOL1 is thus energized, the piston rods 251 of the respective air cylinders 25 project out to turn the arms 24 clockwise as shown in FIG. 7. As a result, the movable platform 1 rises up and the support 3 emerges from the goods carrying surface of the conveyor means 5 to lift up said lot of goods 7. In case the length of one lot of goods in the advancing direction of the conveyor is smaller than the distance X between the switches LS1 and LS2 and the length of two lots of goods is greater than the distance Y between the switches LS1 and LS3, two lots of goods are lifted up at one time by the support 3. For, in this case, the switch LS2 is not closed by mere discharge of one lot of goods from the belt conveyors 51, and instead the relay R11 and solenoid SOL1 are energized when another lot of goods is discharged and the switch LS1 is closed twice, with the switch LS3 being closed by passage of the first lot of goods (see FIG. 5). In case the length of one lot of goods in the advancing direction on the conveyor is smaller than the distance X and the length of two lots of goods in said direction is smaller than the distance Y and also the length of three lots of goods in said direction is greater than the distance Z between the switches LS1 and LS4, three lots of goods are now lifted up at one time by the support 3. For, in this case, the switch LS2 is not closed by mere discharge of one lot of goods from the belt conveyors 51 and also switch LS3 is not closed by mere discharge of two lots of goods from the conveyors 51, and instead the relay R11 and solenoid SOL1 are energized when the switch LS1 is closed thrice upon discharge of three lots of goods and the switch LS4 is closed with discharge of the first lot of goods (see FIG. 5).

As shown in FIG. 5, when the movable platform 1 rises up and the support 3 lifts up the goods 7, the limit switch LS5 is opened by the goods 7 while the limit switch LS7 is closed by the platform 1. The solenoid SOL2 is energized upon closure of the limit switch LS7 to let the piston rod 41 of the air cylinder 4 project out, causing the support 3 to rise up from the level of the roller conveyors 52 as shown in FIG. 8. When the limit switch LS8 is closed with such rise of the support the solenoid SOL3 is energized to let the piston rods 251 of the air cylinders 25 retract, causing the arms 24 to turn counterclockwise on the drawing to let the movable platform 1 and support 3 again descend to their lowered positions as shown in FIG. 9. Under this condition, when the goods 7 is lifted up by a forklift 9 to close the limit switch LS5 or when a switch PB7 (see FIG. 5) is closed by placing a pawl of said forklift 9 or a suitable pallet beneath the support 3, the solenoid SOL4 is energized to retract the piston rod 41 of the air cylinder 4, allowing the support 3 to return to its original position. When the support 3 is returned by closure of the switch PB7, the goods 7 is held back by the pawl portion 62 of the checking means 6, and upon return of the support 3 to its original position, said goods is dropped onto the forklift 9 or a pallet. In the situation where the limit switch LS8 stays closed and the relay R11 is excited with the next lot of goods being placed on the conveyors 52, if another succeeding lot of goods is transferred onto the conveyors 51 and the limit switch LS9 is closed by said goods, the motor M shuts down for an emergency stop.

For operating the apparatus of the present invention manually, the contact S12 for manual operation of the switch S1 is closed while also suitably closing the switches PB3, PB4, PB5 and PB6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A goods discharging apparatus comprising a vertically movable platform, means for lifting said movable platform up and down, including a pair of shafts arranged substantially parallel to each other and rotatably supported by bearings disposed in a base frame, two pairs of arms each of which is secured at its middle portion to each end of each of said shafts, with the upper ends of said respective arms being pivotally secured to said movable platform, two piston-cylinder means, each having its cylinder tube pivotally secured to said base frame, with the piston rod of each of said piston-cylinder means being pivotally secured to the lower end of the corresponding one of said arms which are in turn secured to the corresponding ends of said shafts, and a connecting rod pivotally secured at both of its ends to the lower ends of said respective arms which are secured to the other ends of said shafts, a goods support means mounted on said movable platform, said goods support means extending from the movable platform, means mounted on said movable platform for moving said goods support means in the forward and backward directions, conveyor means having a goods conveying surface, said conveyor means being arranged such that said goods support means can be raised up from the goods carrying surface of said conveyor means with the vertical movement of said movable platform, said goods support means also projecting out from the conveyor means at the same time as it projects out from said movable platform, a checking means disposed at the discharge end of said conveyor means so as not to impede the forward or backward movement of said goods support means, said checking means being provided with a pawl portion which is positioned lower than the upper surface of the goods support means when the goods support means is disposed in its raised position and higher than the upper surface of said goods support means when said goods support means is disposed in its lowered position.

2. The apparatus as set forth in claim 1 wherein said means for moving said goods support means in the forward or backward directions comprises a piston-cylinder means having its piston rod connected to said goods support means and having its cylinder tube fixed to said movable platform.

3. A goods discharging apparatus comprising a vertically movable platform, means for lifting said movable platform up and down, goods support means mounted on said movable platform, said goods support means extending from the movable platform, means mounted on said movable platform for moving said goods support means in the forward and backward directions, conveyor means having a goods carrying surface, said conveyor means being arranged such that said goods support means can be raised up from the goods carrying surface of said conveyor means with the vertical movement of said movable platform, said goods support means also projecting out from the conveyor means at the same time as it projects out from said movable platform, and control means adapted for controlling the operation of said means for lifting the movable platform and said means for moving said goods support means such that one or more lots of goods can be discharged simultaneously depending on the length of one lot of goods in the advancing direction of the conveyor means.

4. The goods discharging apparatus of claim 3 wherein said conveyor means comprises an assembly of belt conveyors and an assembly of roller conveyors extending from the discharge end of said belt conveyor assembly such that the goods support means extends from the discharge end of said belt conveyor assembly toward the discharge end of said roller conveyor assembly.

5. The goods discharging apparatus defined in claim 3, further including a checking means disposed at the discharge end of said conveyor means so as not to impede the forward or backward movement of said goods support means, said checking means being provided with a pawl portion, said pawl portion being positioned lower than the upper surface of the goods support means when the goods support means is in its raised position and higher than the upper surface of said goods support means when said goods support means is disposed in its said lower position.

6. The apparatus as set forth in claim 3, wherein said means for lifting said movable platform up and down comprises a pair of shafts arranged substantially parallel to each other and rotatably supported by bearings disposed in a base frame, two pairs of arms each of which is secured at its middle portion to each end of each of said shafts, with the upper ends of said respective arms being pivotally secured to said movable platform, two piston-cylinder means, each having its cylinder tube pivotally secured to said base frame, with the piston rod of each of said piston-cylinder means being pivotally secured to the lower end of the corresponding one of said arms which are in turn secured to the corresponding end of said shaft, and a connecting rod pivotally secured at both of its ends to the lower ends of said respective arms which are secured to the other ends of said shaft.

7. The apparatus as set forth in claim 3 wherein said means for moving said goods support means in the forward or backward direction comprises a piston-cylinder means having a piston rod connected to said goods support means and having its cylinder tube fixed to said movable platform.

8. A goods discharging apparatus comprising a vertically movable platform, means for lifting said movable platform up and down, a goods support means mounted on said movable platform, said goods support means extending from the movable platform, means mounted on said movable platform for moving said goods support means in the forward and backward directions, conveyor means having a goods conveying surface, and comprising an assembly of belt conveyors and an assembly of roller conveyors extending from the discharge end of said belt conveyor assembly such that said goods support means extends out from said discharge end of said belt conveyor assembly toward the discharge end of said roller conveyor assembly, said conveyor means being arranged such that said goods support means can be raised up from the goods carrying surface of said conveyor means with the vertical movement of said movable platform, said goods support means also projecting out from the conveyor means at the same time as it projects from said movable plaftorm, a checking means disposed at the discharge end of said conveyor means so as not to impede the forward or backward movement of said goods support means said checking means being provided with a pawl portion which is positioned lower than the upper surface of the goods support means when the goods support means is disposed in its raised position and higher than the upper surface of said goods support means when said goods support means is disposed in its lowered position, and control means adapted for controlling the operation of said means for lifting said movable platform and said means for moving said goods support means such that one or more lots of goods can be discharged simultaneously depending on the length of one lot of goods in the advancing direction on the conveyor means.

* * * * *